United States Patent
Blumenstock et al.

(10) Patent No.: US 6,177,997 B1
(45) Date of Patent: Jan. 23, 2001

(54) SHAFT POSITION OPTICAL SENSOR

(75) Inventors: Kenneth A. Blumenstock, College Park; Claef F. Hakun, Dunkirk; Clarence S. Johnson, West River, all of MD (US)

(73) Assignee: The United States of America as represented by the Administrator of the National Aeronautics and Space Administration, Washington, DC (US)

(*) Notice: Under 35 U.S.C. 154(b), the term of this patent shall be extended for 0 days.

(21) Appl. No.: 09/376,000

(22) Filed: Aug. 19, 1999

Related U.S. Application Data

(60) Provisional application No. 60/097,083, filed on Aug. 19, 1998.

(51) Int. Cl.[7] .................................................. G01B 11/14
(52) U.S. Cl. ............................................ 356/375; 356/373
(58) Field of Search ...................................... 356/375, 373

(56) References Cited

U.S. PATENT DOCUMENTS

| | | | |
|---|---|---|---|
| 3,604,940 | * 9/1971 | Matthews | 250/219 |
| 3,908,444 | * 9/1975 | Peter | 73/71.3 |
| 4,082,376 | 4/1978 | Wehde et al. | 308/10 |
| 4,387,935 | 6/1983 | Studer | 308/10 |
| 4,456,378 | 6/1984 | Goldowsky et al. | 356/373 |
| 4,880,991 | * 11/1989 | Boehnlein et al. | 250/560 |
| 5,773,820 | * 6/1998 | Osajda et al. | 250/231.14 |
| 5,864,303 | 1/1999 | Rosen et al. | 340/870.37 |

* cited by examiner

Primary Examiner—Frank G. Font
Assistant Examiner—Phil Natividad

(57) ABSTRACT

The present invention is an optical sensor that senses the movement of a shaft. Detection of radial movement is made when a portion of light incident on the shaft sensor-target is blocked. For detection of axial movement, a disk with flat surface is mounted and used to block a portion of light. The variation in the amount of light allowed to pass through is a measure of the position of the shaft. As proposed by this invention, significant improvement is made with respect to sensitivity and linearity of the system when the light is permanently partially blocked. To accomplish this goal this invention adds a boss to the system. To eliminate possible drift of system performance due to LED degradation or temperature variation, a feedback feature is added to the system.

1 Claim, 5 Drawing Sheets

SHAFT POSITION OPTICAL SENSOR

CROSS-REFERENCES TO RELATED APPLICATIONS

This application now formalizes and incorporates herein by reference U.S. Provisional Application Serial No. 60/097,083, "SHAFT POSITION OPTICAL SENSOR" Kenneth A. Blumenstock et al., filed on Aug. 19, 1998. Applicant claims the priority date thereof under 35 U.S.C. 119(e).

ORIGIN OF THE INVENTION

The invention described herein was made by employees of the United States Government. The invention may be manufactured and used by or for the Government for governmental purposes without the payment of royalties thereon or therefor.

FIELD OF THE INVENTION

The present invention relates to magnetic bearings and more particularly to optical position sensing for magnetic bearings.

BACKGROUND OF THE INVENTION

A magnetic bearing, which includes a rotor and a stator concentrically located with respect to each other, typically controls the radial or axial distance between the rotating rotor and the stationary stator. More specifically, adjustable electromagnetic forces generated by current flowing through coils wrapped around the stator, as controlled by a control circuit adjusts distance between the stator and rotor. U.S. Pat. Nos. 4,387,935 and 4,082,376 describe details of the magnetic bearing.

To measure the position of the magnetic bearing rotor and to provide input signals to the control circuit to adjust the forces by adjusting the current through the coils, non-contacting sensors have been used including inductive sensor and capacitance type sensors.

The inductive sensor measures the eddy current generated by sensor coils. U.S. Pat. No. 4,082,376 describes the inductive sensors used in magnetic bearings. In capacitive sensors, a variable capacitor is used to sense gap distance and the resulting capacitance change is converted into an electrical signal indicative of the gap. U.S. Pat. No. 5,864,303 describes a capacitive sensor system for magnetic bearings. A drawback of both types of sensors, however, is that they are prone to electromagnetic interference (EMI) generated by the electro-magnetic coils of the magnetic bearing. Thus they cannot be placed too close to electromagnetic coils of the magnetic bearing. Further, they tend to drift as operating temperature changes. Therefore, these types of sensors cannot guarantee long term stability due to their sensitivity to temperature and EMI.

Optical position sensors provide position information for magnetic bearings, overcoming the drawbacks mentioned above. In other words, the optical position sensor is insensitive to the EMI generated by the magnetic bearing and can be placed within or very near the electromagnet of the magnetic bearing. Further, the optical position sensor possesses characteristics of long term stability and high resolution.

U.S. Pat. No. 4,456,378 describes an optical sensor for sensing the radial position of a shaft when a portion of a light beam incident on the shaft sensor-target is blocked. The referenced patent proposes the light beam to have a relatively small diameter and be well collimated in order to pass sufficient energy to the detector and in order to provide a high sensitivity to shaft position. When using an optical position sensor, scattering effects must be taken into account as well as calibrating the intensity of the light beam. However, the referenced patent does not recognize design features needed for dealing with the effects of scattered light reflected by the sensor target and the interior of the sensor housing. It also includes a rather complex feedback system requiring shaft motion and sophisticated electronics for calibrating intensity of the light beam.

Thus, it is an object of this invention to provide optical position information for magnetic bearings.

It is a further object of this invention to provide an optical position sensor that possesses long term stability by compensating for degradation of a light beam source or temperature variation.

It is still another object of this invention to provide an optical position sensor that can perform well when scattered light is present either by generation from the light source or by reflection by the shaft sensor-target or the interior of the sensor housing.

SUMMARY

The proposed invention is an optical sensor that senses the movement of a shaft. To better appreciate the significance of this invention, a discussion regarding prior art optical position behavior is in order. Optical position sensing of a shaft is possible by arranging an LED and photodetector pair to be opposing one another and on the same axis. A highly non-linear behavior exists as the shaft sensor-target is displaced so that it obstructs the light energy reaching the photodetector. Initial displacement from the nominal shaft position will reduce the energy at a lesser rate because a significant amount of scattered light can find its way around the shaft sensor-target and reflect off the shaft sensor-target and interior surfaces of the sensor housing. Also, the energy pattern emitting from the LED is such that the energy drops off as viewed at increasing angles from the LED axis. The sensitivity of the photodetector has a similar behavior with highest sensitivity along the photodetector axis, and decreasing sensitivity for increasing detection angles with respect to the photodetector axis. As the shaft is displaced further, the photodetector output will drop off more rapidly, partly as a result of the LED/photodetector energy pattern/sensitivity and partly due to lesser energy reflected around the shaft sensor-target, thus resulting in highly non-linear behavior.

This invention uses an improved method for reducing the light energy reaching the photodetector so that the behavior between shaft displacement is such that linearity is much improved. The sensor housing is configured so the shaft sensor-target approaches a fixed surface or boss in the sensor housing. The boss, a means for permanently partially blocking the light beam, is disposed between the LED and photodetector. As viewed by the photodetector, the space formed by the shaft sensor-target and the boss appears to be a slit. The apparent slit will change area linearly with shaft displacement. It is possible to align the LED/photodetector axis such that it passes through the center of the apparent slit when the shaft is in the nominal position, utilizing the highest energy and most uniform part of the light emitted. Since the energy is essentially uniform, and the apparent slit changes area linearly with position, the system linearity is vastly improved over the prior art.

The optical sensor can be configured to measure radial or axial movement of a shaft. Detection of radial movement is made when a portion of light incident on the shaft sensor-target is blocked. For detection of axial movement, a disk is mounted on a shaft and its flat surface is used to block a portion of light. The variation in the amount of light allowed to pass through is a measure of the position of the shaft. To eliminate possible drift of system performance due to LED degradation or temperature variation, a feedback feature is added to the system.

Radial sensing is accomplished by detecting two axes of motion in a plane orthogonal to the shaft axis. In the preferred embodiment, LED/photodetector pairs(LPP) are oriented such that their axes are aligned, and they face one another, so that maximal light energy reaches the photodetectors. Looking along the shaft axis, the arrangement of LPP's are such that their axes are orthogonal and near tangent to the shaft or shaft sensor-target in four locations including above, below, and each side of the sensor-target cross-section. A sensor-target, which is mounted on the shaft, may be used as the optical target rather than the shaft itself. If the beams of light were visible, they would form a box around the circular cross-section of the sensor-target. A sensor housing is used as a holder of all the components so that the LPP's are held into an assembly. The sensor housing, which is opaque to light emitted by the LED's provides a number of bores to guide the light to the photodetectors. The bore is interrupted in the area of the shaft sensor-target so that the shaft sensor-target may partially obscure the light beam as a function of shaft position.

The bore is also partially interrupted by a fixed boss built into the sensor housing. A boss is a protuberance disposed between the light source and the photodetector. In this way the sensor-target squeezes the light through a space formed by the cylindrical sensor-target approaching a flat surface on the boss. Viewing along the LPP axis through the bore, the space appears as a slit. Moving the shaft position in the appropriate axis varies the apparent slit width, changing the amount of light energy reaching the photodetectors. Inclusion of the boss is responsible for significant performance improvement with regards to sensitivity and linearity. If the light was collimated, it would not be apparent that the boss is necessary, but because scattered light is always present, at least due to reflection at small incidence angles by the shaft sensor-target, the boss is necessary to block the scattered light. Without the boss present, scattered light will find its way around the sensor-target to the photodetector causing a very non-linear relationship between shaft position and sensor output as exists in the prior-art.

A linear amplifier provides an analog voltage output that is proportional to shaft position for each axis. Only two LPP's are necessary for radial sensing. However, with four LPP's, two can be used for redundant operation or opposing same-axis LPP's can be wired for differential operation for improved performance.

An additional feature eliminates the possibility of drift due to LED degradation or temperature variation. A feedback photodetector is installed next to each LED. A hole through the plane of the sensor housing locates a small pin with a machined flat so that it reflects some of the light energy from an LED to its feedback photodetector. The pin is positioned so as not to interfere with light that would pass through the apparent slit. A bore is necessary from the reflective surface location to the feedback photodetector. Each feedback photodetector signal will command the electronics to drive each appropriate LED to emit a constant intensity.

In another embodiment, LPP's are oriented so that the axes of an LED and its photodetector pair form an angle to one another and are approximately tangent to the shaft or shaft sensor-target axis. Otherwise its description is identical to that of the previously described preferred embodiment. Light energy emitted from an LED reaches its photodetector pair by reflection off the sensor housing interior. This arrangement may prove beneficial if space requirements do not allow an LED and photodetector to oppose one another on the same axis.

Axial sensing is accomplished in a very similar manner to radial sensing. A disk is mounted on a shaft with its flat surface used as the sensor-target. Viewing through the LPP axis, the appearance of a slit is as before. The space is formed by the flat surface of the target approaching the flat counterbore surface of the sensor housing. As in the case of the radial sensor, the counterbore plays an important role in blocking scattered light energy from reaching the detector. If the light source were collimated, it would appear that only the sensor-target would be necessary to block the light energy. However, even collimated light will reflect off the flat surface of the sensor-target at small angles of incidence no matter what kind of anti-reflective coating may be applied. The apparent slit width varies linearly with motion of the target and the photodetector output exhibits a highly linear relationship with shaft position.

Only a single LPP is necessary since only a single axis of sensing is required. For redundant operation, another LPP may be necessary, but for differential operation, the additional LPP needs to sense the flat surface of the other side of the disk approaching an opposing counterbore. The geometry of the axial sensor allows feedback photodetctors to be employed without using a reflective surface, but with each photodetector directly viewing light energy emitted from the periphery of each LED.

In another preferred embodiment, offsetting a circular cross-section sensor-target so that it is not concentric with the shaft rotation axis, allows the same sensor arrangement as used for radial sensing to sense angular position. Redundant or additive (rather than differential) operation may be employed. Sensor output is sinusoidal with the second axis 90 degrees out of phase with the first, giving rotation direction information. Electronics similar to that used with resolvers can process the sensor output. Non-circular sensor-targets can be used to generate specially required outputs which are a function of angular position.

DETAILED DESCRIPTION OF THE INVENTION

Figure 1:
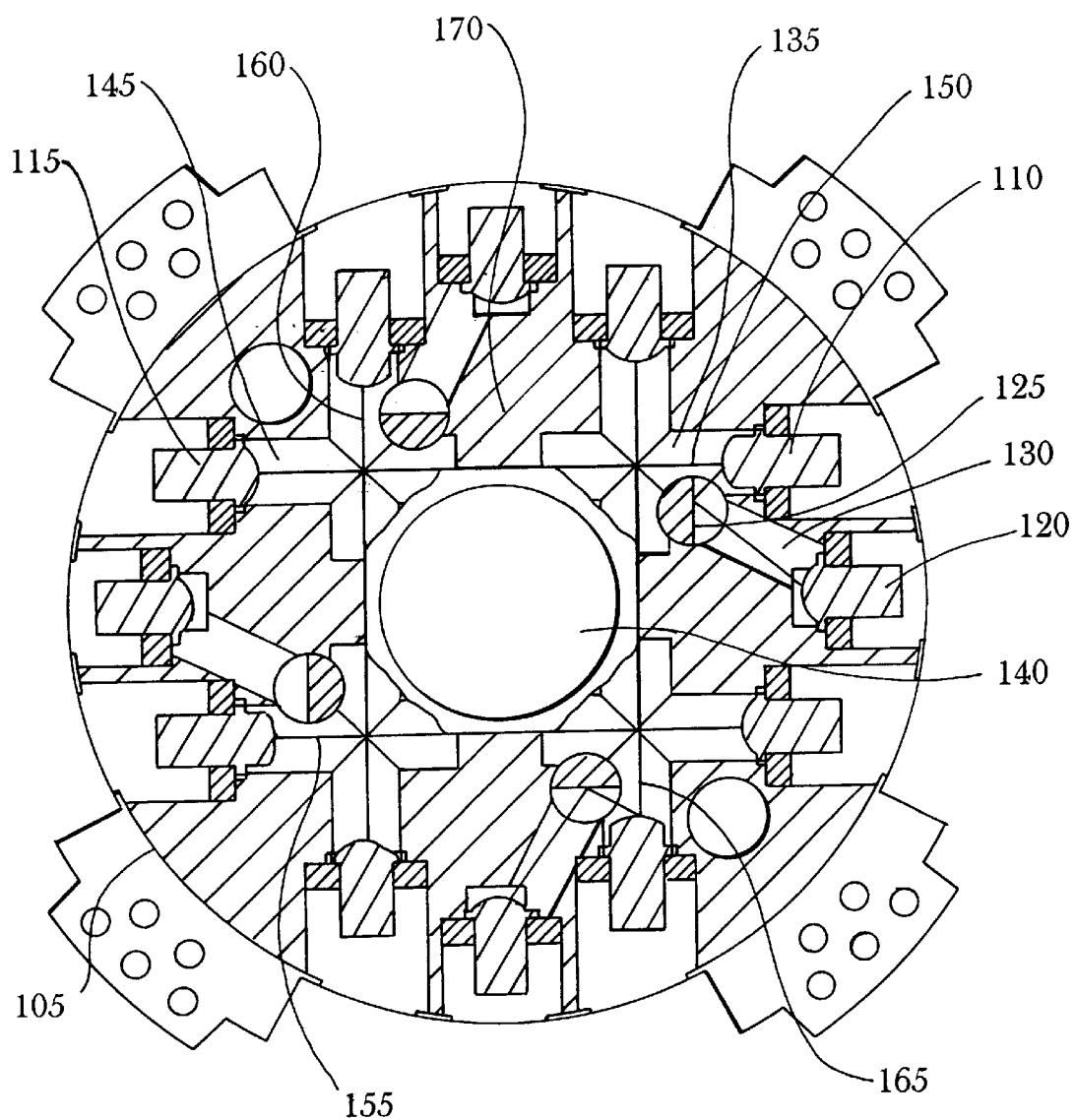
FIG. 1 is a cross-sectional view of the radial sensor of the first preferred method of the invention.

Referring to FIG. 1, the components used for a single axis of radial sensing are described. LED 110, a light source, is oriented so that its axis 150 is aligned with opposing photodetector 115, a first photdetector. Feedback photodetector 120, a second photodetector, is located adjacent to its axis parallel to LED 110 and is supplied with peripheral light energy that is reflected by mirror 125 which then passes through bore 130. The feedback photodetector 120 was added to the system to eliminate possible drift of system performance due to LED degradation or temperature variation. Light energy from LED 110 first passes through bore 135. Sensor-target 140 is situated so that it obstructs light energy emitted from LED 110 and received by photodetector 115. A boss 170, which is means for permanently partially blocking the light and a part of sensor housing 105, also obstructs light energy passing from LED 110 to photodetector 115. Light energy received by photodetector 115 is first passed through bore 145, which is means for guide the light from the LED. Sensor housing 105 contains the LED's and photodetectors for all the axes and all the bores and bosses are formed by or contained by it. The sensor housing is opaque to light emitted by the LED's. The energy received by feedback photodetector 120 is not influenced by the sensor-target position. Mirroring the described components and features to that of an identical arrangement located on the opposite side of sensor-target 140 with an LED/photodetector axis 155 parallel to LED/photodetector axis 150 allows for either redundant operation or differential operation for improved signal-to-noise ratio and noise rejection. Duplicating and rotating by ninety degrees all the previously described components and features gives a second axis of sensing required for radial sensing as shown by axes 160 and 165.

Figure 2:
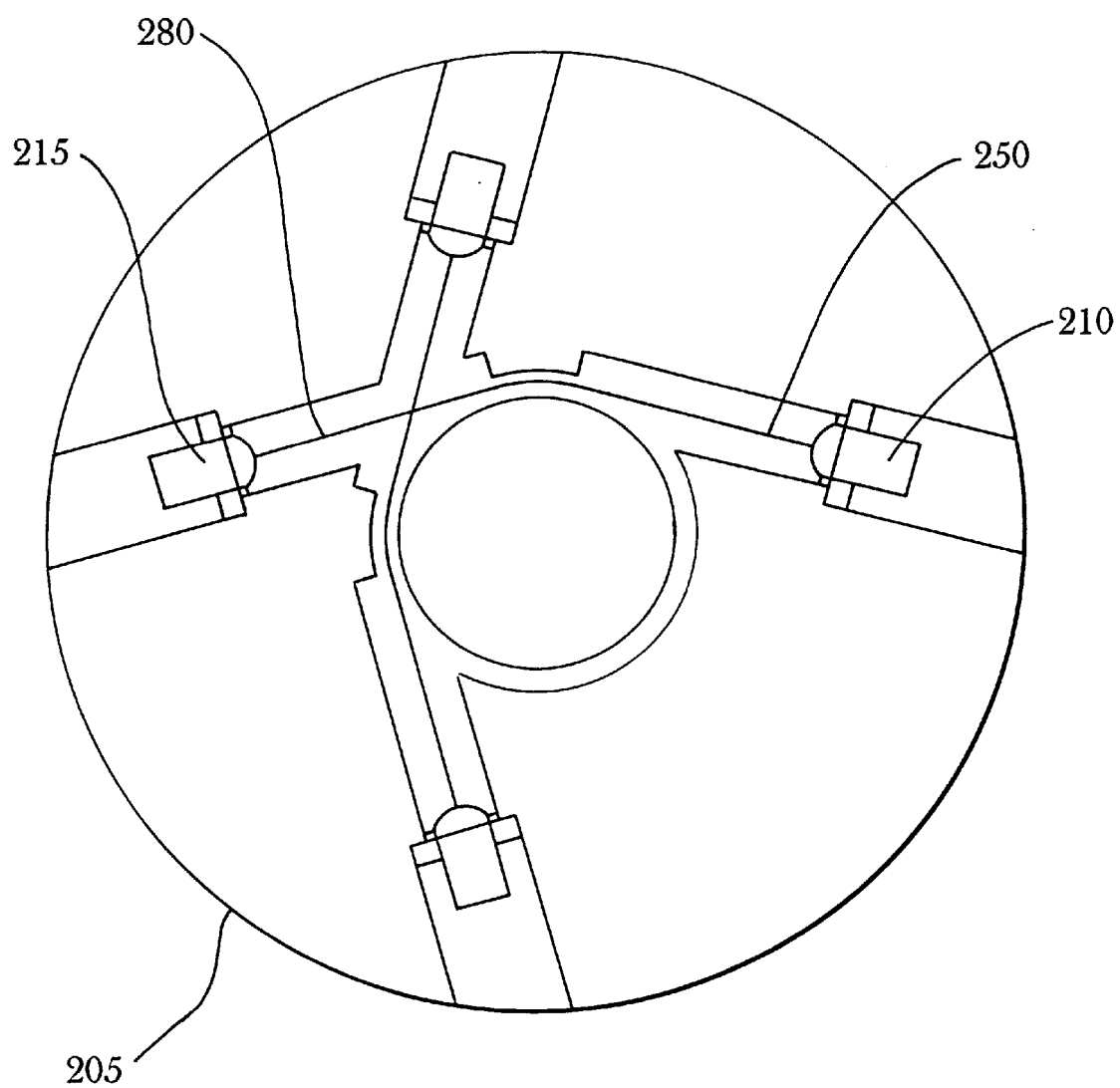
FIG. 2 is a cross-sectional view of the radial sensor of the second preferred method of the invention.

The second embodiment of a radial sensor is shown in FIG. 2. The arrangement is similar to that of the preferred embodiment, but with LED 210 oriented so that its axis 250 is at an angle from the axis 280 of its photodetector pair 215. A feedback detector scheme can be employed either using a reflective surface as in the preferred embodiment of FIG. 1, or without a reflective surface if oriented like feedback photodetector 320 of FIG. 3.

Figure 3:
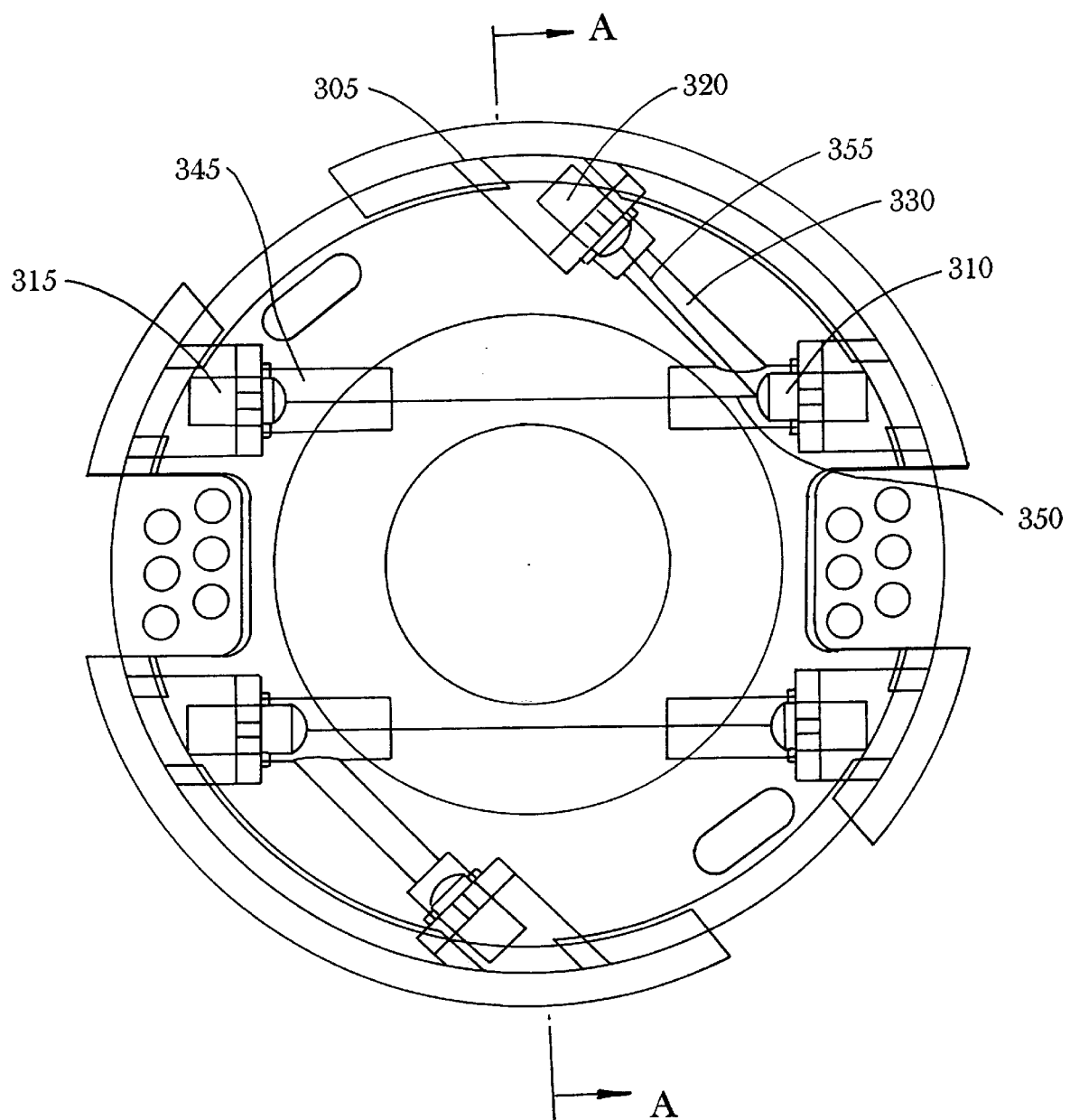
FIG. 3 is a cross-sectional view of axial sensor of the first preferred method of the invention viewed along the shaft axis.
Figure 4:
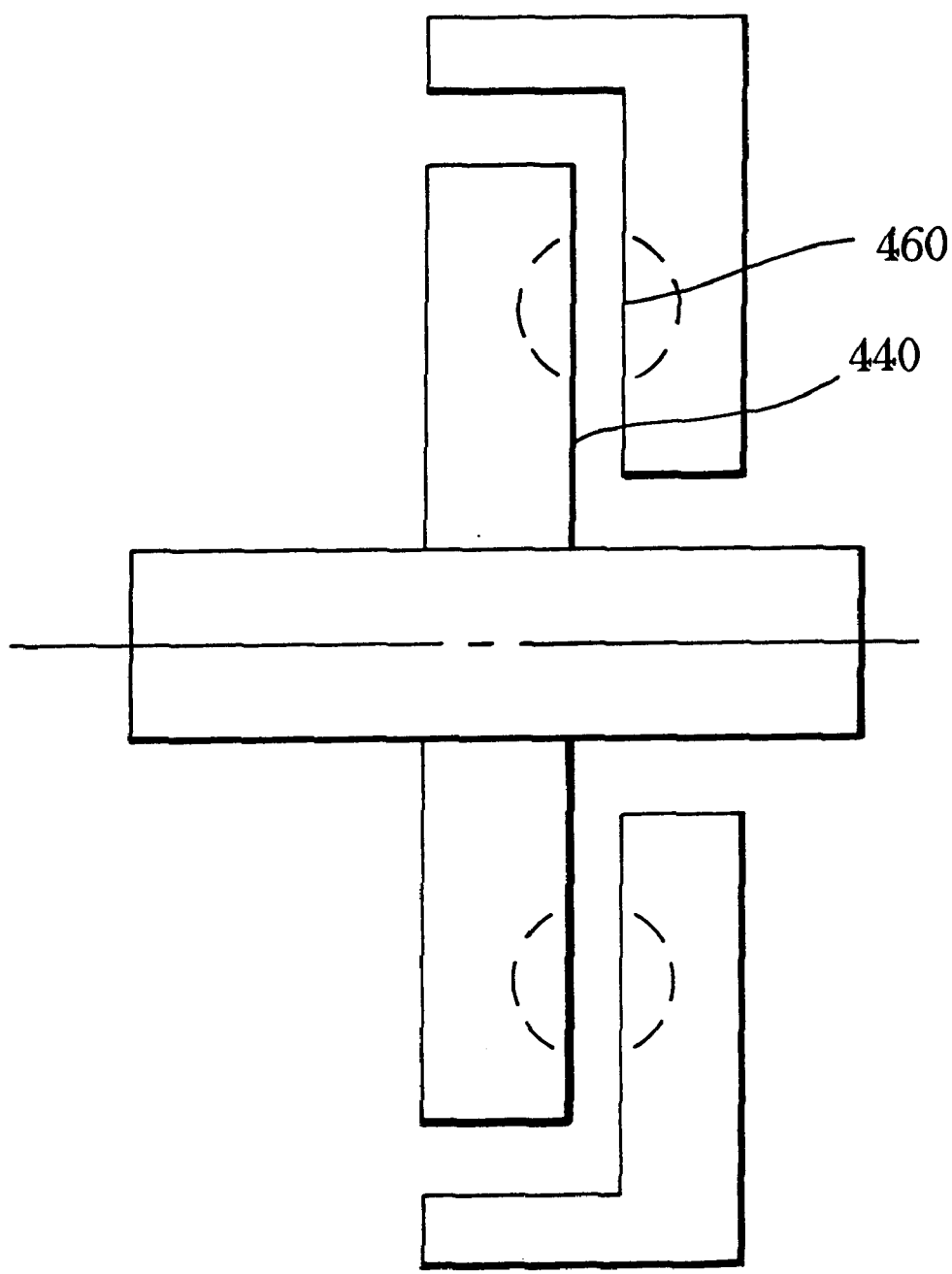
FIG. 4 is a second cross-sectional view of the axial sensor taken along line A—A of FIG. 3.

Referring to FIG. 3, the components used for axial sensing are described. LED 310 is oriented so that its axis 350 is aligned with opposing photodetector 315. Feedback photodetector 320 is located with its axis 355 at some angle from the axis of LED 310 and is supplied with some of the LED's 310 peripheral light energy which passes through bore 330. Light energy from LED 310 first passes through bore 335. Sensor-target 440 is situated so that it obstructs light energy emitted from LED 310 and received by photodetector 315 as shown in FIG. 4. A counterbore 460, a part of sensor housing 305, also obstructs light energy passing from LED 310 to photodetector 315. Light energy received by photodetector 315 is first passed through bore 345. Sensor housing 305 contains the LED's and photodetectors for all the axes and all the bores and counterbore are formed by or contained by it. The sensor housing is opaque the light emitted by the LED's. The energy received by feedback photodetector 320 is not influenced by the sensor-target position. Mirroring the described components and features to that of an identical arrangement located on the opposite surface of sensor-target 440 allows either redundant operation or differential operation for improved signal-to-noise ratio and noise rejection.

Figure 5:
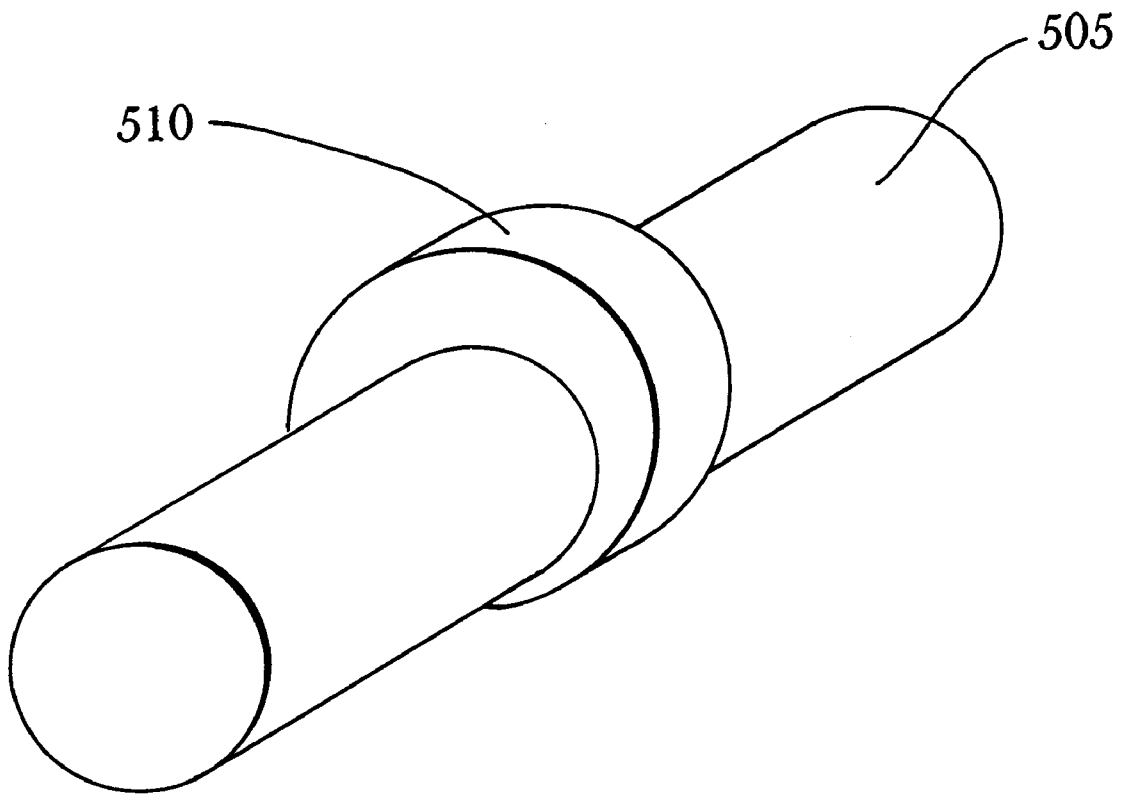
FIG. 5 is an isometric view of the angular sensor shaft with sensor-target of the first preferred method of the invention.

For angular sensing, sensor housings 105 or 205 are used with shaft 505 which has a sensor-target 510 that is non-concentric with the shaft's rotational axis as shown in FIG. 5. A sinusoidal output will be generated if sensor-target cross-section 510 is circular, but non-circular shapes can be used to generate other waveforms if desired.

What is claimed is:

1. An optical position sensor for sensing radial position of a shaft comprising:

a light source;

means for guiding a beam of light from said source to said shaft sensor-target so that a portion of said beam is blocked by said shaft sensor-target and a second portion of said beam is allowed to pass by said shaft sensor target;

a first light detector for detecting the portion of said beam allowed to pass by said shaft sensor-target, light detected by said first photodetector being the portion of said beam allowed to pass by said shaft sensor-target, said light providing a measure of the position of said shaft;

a second light detector for detecting the portion of said light beam, said light beam being detected before being blocked by said shaft sensor-target, wherein said photodetector is a feedback photodetector; and boss for permanently partially blocking said light beam.

* * * * *